(12) United States Patent
Park et al.

(10) Patent No.: US 8,703,324 B2
(45) Date of Patent: Apr. 22, 2014

(54) ELECTRODE CONNECTOR AND BATTERY MODULE USING THE SAME

(75) Inventors: Sang-Hun Park, Yongin-si (KR); Dea-Yon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 183 days.

(21) Appl. No.: 13/162,372

(22) Filed: Jun. 16, 2011

(65) Prior Publication Data
US 2012/0189900 A1 Jul. 26, 2012

(30) Foreign Application Priority Data

Jan. 24, 2011 (KR) ........................ 10-2011-0006835

(51) Int. Cl.
*H01M 6/42* (2006.01)
*H01M 2/24* (2006.01)
*H01M 4/02* (2006.01)
*H01M 4/13* (2010.01)

(52) U.S. Cl.
USPC .......................................... 429/158; 429/211

(58) Field of Classification Search
None
See application file for complete search history.

(56) References Cited

U.S. PATENT DOCUMENTS

| 2002/0094475 A1 | 7/2002 | Aoyama |
| 2006/0160422 A1 | 7/2006 | Bang et al. |
| 2008/0254356 A1* | 10/2008 | Liersch et al. ............... 429/160 |
| 2009/0246620 A1 | 10/2009 | Lee et al. |
| 2010/0136419 A1 | 6/2010 | Kwak et al. |
| 2011/0008667 A1 | 1/2011 | Kwag et al. |

FOREIGN PATENT DOCUMENTS

| JP | 2002-117828 A | 4/2002 |
| JP | 2002-216722 A | 8/2002 |
| KR | 10-2006-0059175 | 6/2006 |
| KR | 10-0933843 B | 12/2009 |
| KR | 10-2010-0063378 | 6/2010 |
| KR | 10-2011-005168 A | 1/2011 |

OTHER PUBLICATIONS

Cirlex website (http://cirlex.com, Wayback machine indicates available online since at least Mar. 2009).*
KIPO Registration Determination Certificate dated Dec. 4, 2012 for priority KR Application No. 10-2011-0006835 (4 pages).

* cited by examiner

*Primary Examiner* — Yoshitoshi Takeuchi
(74) *Attorney, Agent, or Firm* — Christie, Parker & Hale, LLP

(57) ABSTRACT

An electrode connector and a battery module using the same are provided. The electrode connector includes a plurality of lead plates sequentially aligned and for electrically connecting a plurality of batteries, and a connection unit for integrally connecting the lead plates. Each of the lead plates includes a protrusion and a recess. The protrusion of one lead plate is accommodated in the recess of another lead plate. The one lead plate and the another lead plate are spaced apart from each other.

10 Claims, 7 Drawing Sheets

ELECTRODE CONNECTOR AND BATTERY MODULE USING THE SAME

CROSS-REFERENCE TO RELATED APPLICATION

This application claims priority to and the benefit of Korean Patent Application No. 10-2011-0006835, filed on Jan. 24, 2011, in the Korean Intellectual Property Office, the entire content of which is incorporated herein in its entirety by reference.

BACKGROUND

1. Field

Aspects of one or more embodiments of the present invention relate to an electrode connector and a battery module using the same.

2. Description of Related Art

As technologies regarding portable devices are increasingly developed and demanded, secondary batteries are highly in demand as power supplies for these portable devices.

According to the types of devices powered by secondary batteries, a single battery may be used or a plurality of electrically connected batteries may be used. For example, a small device, such as a mobile phone, may operate for a period of time by using the output power and capacity of one battery while a medium or large device, such as a laptop computer, a portable digital versatile disk (DVD) player, or a compact personal computer (PC), may require a plurality of batteries to provide large output power and capacity.

A battery pack, in which a protection circuit is connected to a core pack, may include a plurality of batteries connected in series and/or in parallel. When battery packs are manufactured, batteries should be electrically connected in a stable manner to realize sufficient output power and capacity.

SUMMARY

Aspects of one or more embodiments of the present invention are directed toward a battery module including one electrode connector having a rigidity (e.g., a predetermined rigidity) and batteries electrically connected by using the electrode connector.

Additional aspects will be set forth in part in the description which follows and, in part, will be apparent from the description, or may be learned by practice of the presented embodiments.

According to one or more embodiments of the present invention, an electrode connector includes a plurality of lead plates sequentially aligned and for electrically connecting a plurality of batteries; and a connection unit for integrally connecting the lead plates, wherein each of the lead plates includes a protrusion and a recess, wherein the protrusion of a first one of the lead plates is accommodated in the recess of a second one of the lead plates, and wherein the first one of the lead plates and the second one of the lead plates are spaced apart from each other.

One of the lead plates may include a main body for contacting electrode terminals of batteries; a first protrusion protruding from a first side of the main body; and a second protrusion protruding from a second side of the main body.

The one of the lead plates may further include a first recess formed at the second side of the main body and having a shape corresponding to the first protrusion; and a second recess formed at the first side of the main body and having a shape corresponding to the second protrusion.

The first and second protrusions may be substantially symmetrical with respect to a center of the main body.

One of the lead plates may further include a sensing part for monitoring a state of a corresponding one of the batteries.

The connection unit may include an insulating tape.

The connection unit may be on upper surfaces or lower surfaces of the lead plates.

The connection unit may be on upper surfaces of the lead plates, and may include open regions for exposing regions of the lead plates.

The connection unit may include a first connection unit bonded to upper surfaces of the lead plates, and having open regions for allowing electrode terminals of the batteries to directly contact the lead plates; and a second connection unit bonded to the first connection unit and lower surfaces of the lead plates.

The connection unit may have marks or grooves for determining positions of the lead plates.

The connection unit may have first through holes for determining positions of the lead plates, wherein the lead plates may have second through holes corresponding to the first through holes, and the connection unit and the lead plates may be aligned via matching the first and second through holes.

The connection unit may have through holes corresponding to the protrusions of the lead plates.

The lead plates may be aligned in one direction.

According to one or more embodiments of the present invention, a battery module includes a plurality of batteries; a plurality of lead plates sequentially aligned in one direction and for electrically connecting the batteries; and a connection unit for integrally connecting the lead plates, wherein each of the lead plates includes a protrusion and a recess, wherein the protrusion of a first one of the lead plates is accommodated in the recess of a second one of the lead plates, and wherein the first one of the lead plates and the second one of the lead plates are spaced apart from each other.

One of the lead plates may contact an electrode terminal of a first battery and an electrode terminal of a second battery from among the batteries.

The lead plates and the electrode terminals may be welded or soldered together.

One of the lead plates may include a main body contacting electrode terminals of corresponding ones of the batteries; a first protrusion protruding from a first side of the main body; and a second protrusion protruding from a second side of the main body.

The one of the lead plates may further include a first recess formed at the second side of the main body and having a shape corresponding to the first protrusion; and a second recess formed at the first side of the main body and having a shape corresponding to the second protrusion.

The one of the lead plates may further include a sensing part for monitoring a state of a corresponding one of the batteries.

The connection unit may include an insulating tape.

The connection unit may be on upper surfaces or lower surfaces of the lead plates.

The connection unit may have marks or grooves for determining positions of the lead plates.

The connection unit may include a first connection unit bonded to upper surfaces of the lead plates, and the first connection unit includes open regions for allowing electrode terminals of the batteries to directly contact the lead plates; and a second connection unit bonded to the first connection unit and lower surfaces of the lead plates.

BRIEF DESCRIPTION OF THE DRAWINGS

These and/or other aspects of the present invention will become apparent and more readily appreciated from the following description of the embodiments, taken in conjunction with the accompanying drawings of which.

DETAILED DESCRIPTION

Figure 1:
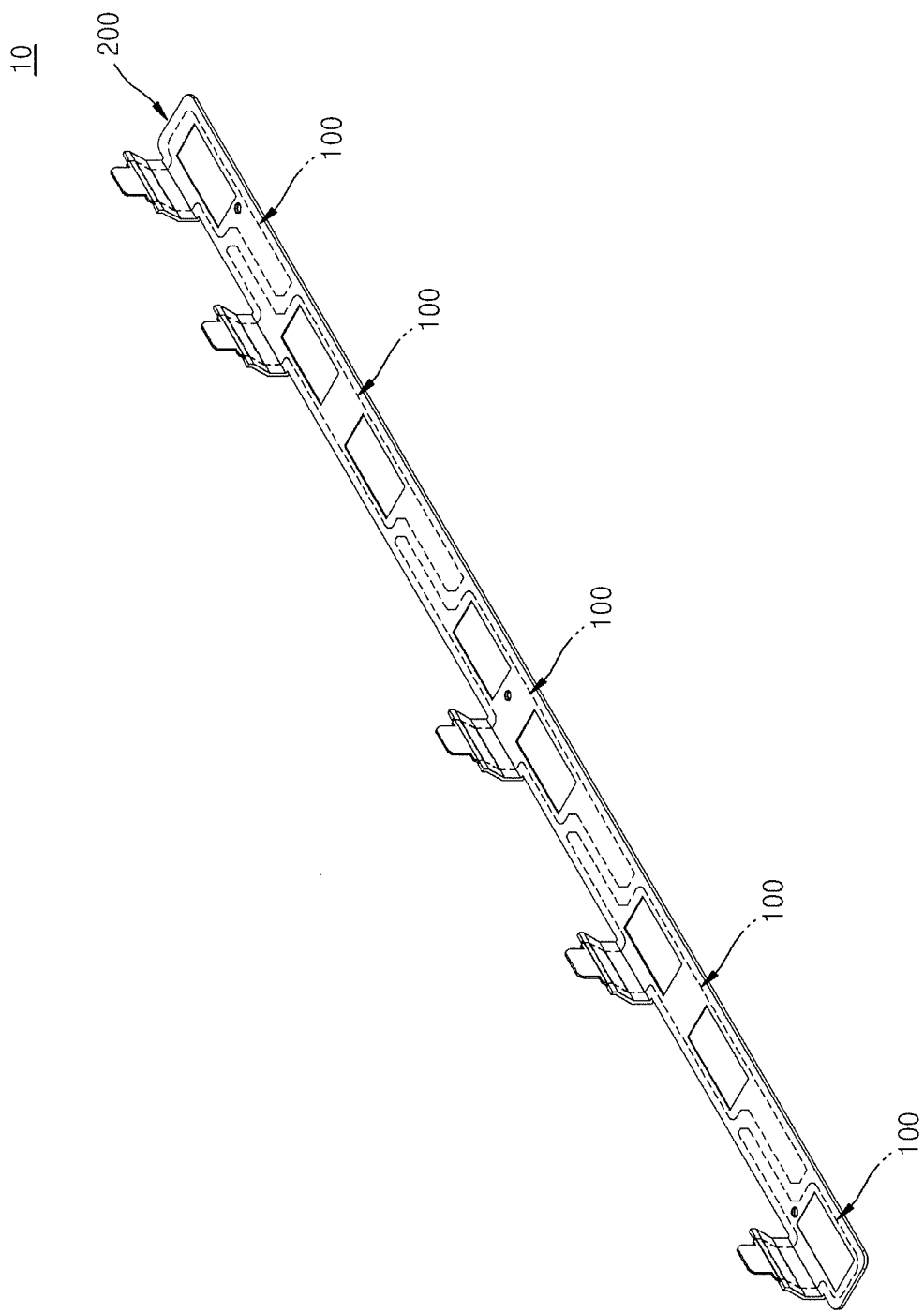
FIG. 1 is a perspective view of an electrode connector according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present invention.

Figure 2:
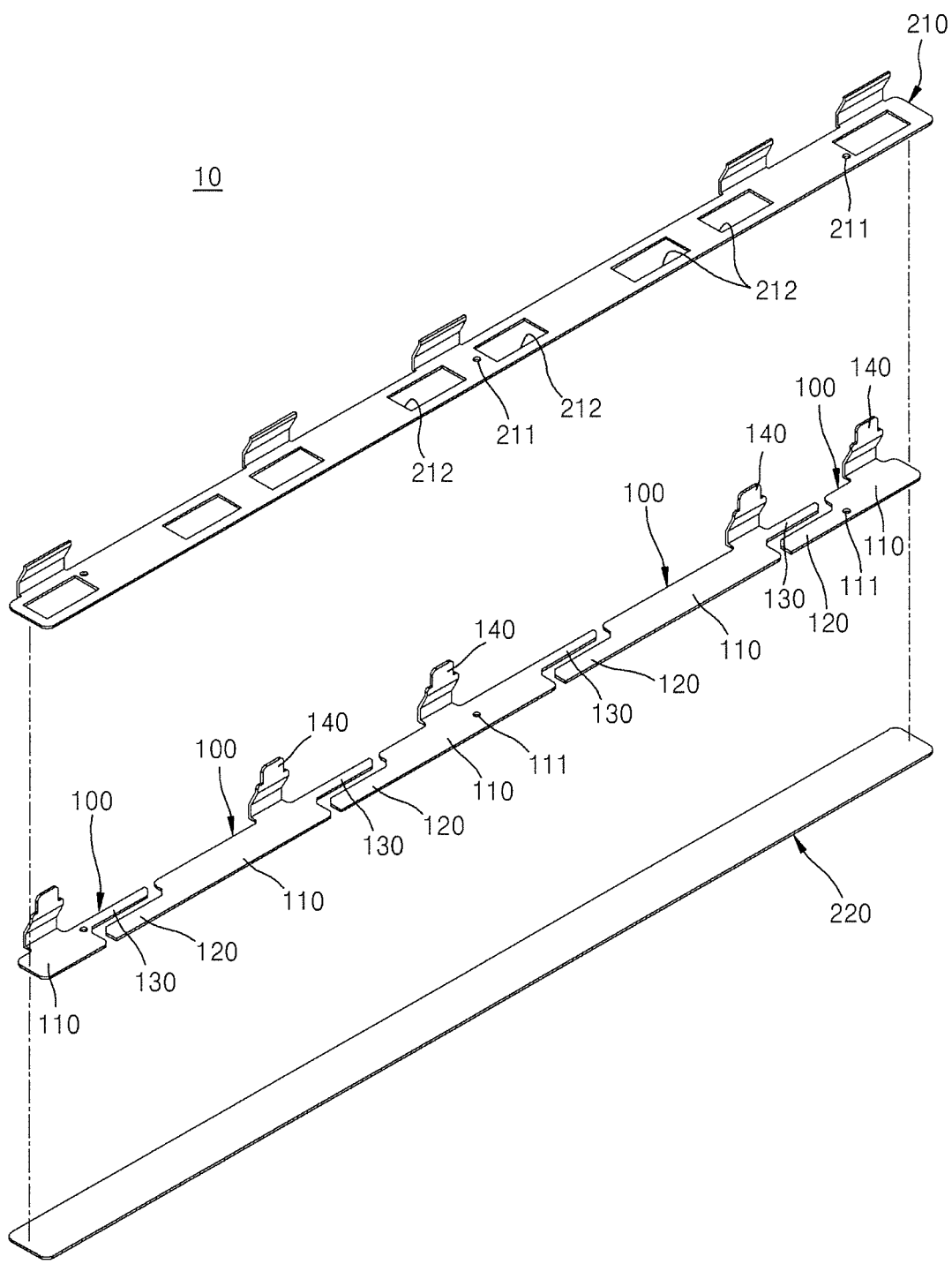
FIG. 2 is an exploded perspective view of the electrode connector illustrated in FIG. 1.
Figure 3:
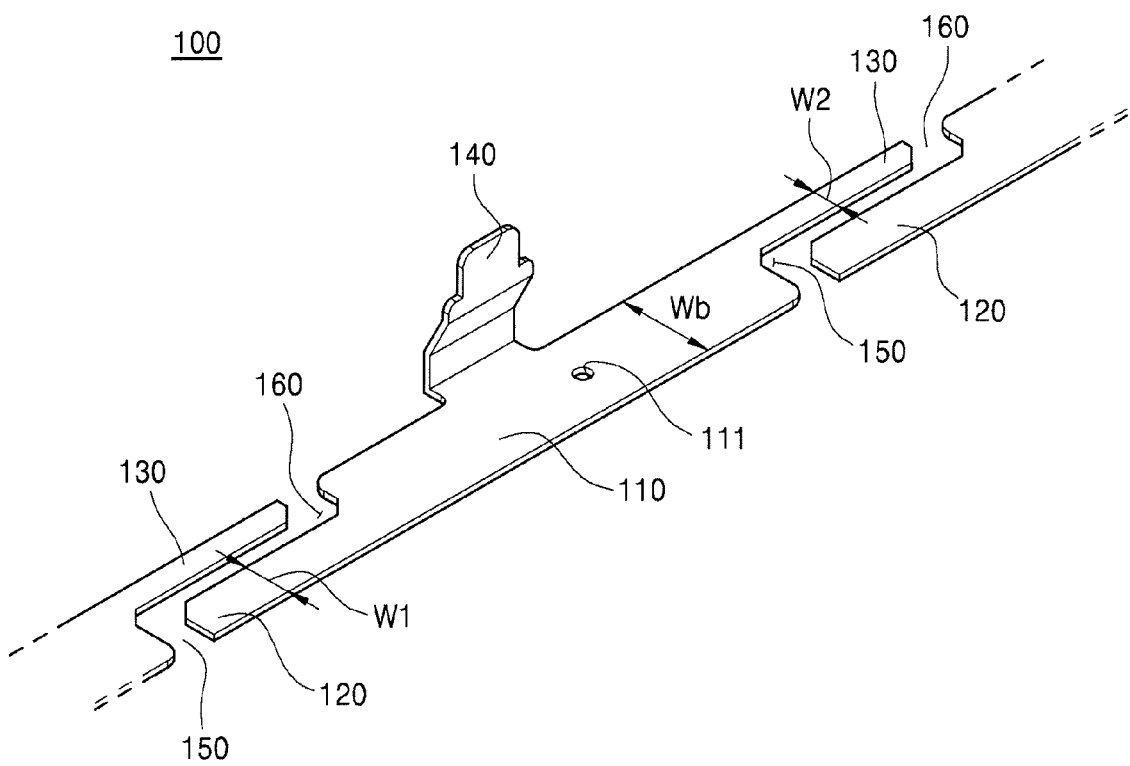
FIG. 3 is a perspective view of a lead plate of the electrode connector illustrated in FIG. 1.

FIG. 1 is a perspective view of an electrode connector 10 according to an embodiment of the present invention. FIG. 2 is an exploded perspective view of the electrode connector 10 illustrated in FIG. 1. FIG. 3 is a perspective view of a lead plate 100 of the electrode connector 10 illustrated in FIG. 1.

Referring to FIGS. 1 and 2, the electrode connector 10 includes a plurality of lead plates 100 and a connection unit 200 for integrally connecting the lead plates 100.

The lead plates 100 are sequentially aligned in one direction at intervals (e.g., predetermined intervals). The lead plates 100 are used to electrically connect a plurality of batteries, and neighboring lead plates 100 may be spaced apart by a distance as long as they do not physically contact each other.

Referring to FIG. 3, the lead plate 100 may include a main body 110 for contacting electrode terminals, first and second protrusions 120 and 130, second and first recesses 160 and 150 formed respectively at two sides of the main body 110, and a sensing part 140. The main body 110 and the first and second protrusions 120 and 130 may be formed on the same plane, and the sensing part 140 may be bent from the main body 110 and the first and second protrusions 120 and 130 by an angle (e.g., a predetermined angle).

The main body 110 directly contacts electrode terminals of a unit battery, and a plurality of batteries are electrically connected via the main bodies 110. For example, the main body 110 may contact a positive electrode terminal (or a negative electrode terminal) of one battery and a negative electrode terminal (or a positive electrode terminal) of another battery, thereby realizing electrical connection between the two batteries.

The first and second protrusions 120 and 130 are formed respective at two sides of the main body 110. For example, the first protrusion 120 may be formed at a left side of the main body 110, and the second protrusion 130 may be formed at a right side of the main body 110. In one embodiment, the second recess 160 may be formed at the side where the first protrusion 120 is formed, and the first recess 150 may be formed at the side where the second protrusion 130 is formed. In this case, a shape of the first recess 150 may have a suitable shape corresponding to the shape of the first protrusion 120, and a shape of the second recess 160 may have a suitable shape corresponding to the shape of the second protrusion 130. Accordingly, the first protrusion 120 of one lead plate 100 may be accommodated (or received) in the first recess 150 of a neighboring lead plate 100, and the second protrusion 130 of the lead plate 100 may be accommodated (or received) in the second recess 160 of another neighboring lead plate 100.

Widths W1 and W2 of the first and second protrusions 120 and 130 are both less than a width Wb of the main body 110. In this case, the first recess 150 may have a width obtained by subtracting the width W2 of the second protrusion 130 from the width Wb of the main body 110, and the second recess 160 may have a width obtained by subtracting the width W1 of the first protrusion 120 from the width Wb of the main body 110.

The first and second protrusions 120 and 130 may be formed symmetrically with respect to the center of the main body 110. For example, if the first protrusion 120 is formed at a bottom-left side of the main body 110, the second protrusion 130 may be formed at a top-right side of the main body 110. Alternatively, if the first protrusion 120 is formed at a top-left side of the main body 110, the second protrusion 130 may be formed at a bottom-right side of the main body 110.

The sensing part 140 may protrude in one direction, and may form an angle (e.g., a predetermined angle) with respect to the main body 110 and the first and second protrusions 120 and 130. The sensing part 140 may contact a monitoring device in order to monitor the state of a battery. The monitoring device may obtain information regarding, for example, a voltage, a current, and a temperature of a battery via the sensing part 140.

Referring back to FIGS. 1 and 2, a plurality of lead plates 100 are formed according to the number of batteries. Here, the lead plates 100 positioned at two ends of the electrode connector 10 may include the main body 110, the first or second protrusion 120 or 130, and the second or first recess 160 or 150.

The connection unit 200 integrally connects the lead plates 100. The connection unit 200 may have a tape shape extending in one direction according to the alignment of the lead plates 100, and may be bonded to upper and lower surfaces of the lead plates 100. The connection unit 200 may include a first connection unit 210 bonded to the upper surfaces of the lead plates 100, and a second connection unit 220 bonded to the lower surfaces of the lead plates 100. For example, the connection unit 200 may be an insulating tape such as a polyimide (PI) tape.

The first connection unit 210 is bonded to the upper surfaces of the lead plates 100 to fix or secure the lead plates 100. The first connection unit 210 is partially open to allow the main bodies 110 of the lead plates 100 to directly contact electrode terminals of batteries. Here, the reference numeral 212 indicates open regions. Also, portions at one side of the first connection unit 210 may protrude in a direction to contact portions of the sensing parts 140 of the lead plates 100.

The first connection unit 210 includes first through holes 211, and the lead plates 100 include second through holes 111. The first and second through holes 111 and 211 function as marks (e.g., alignment marks) for guiding bonding positions between the first connection unit 210 and the lead plates 100. For example, the first connection unit 210 and the lead plates 100 are bonded to each other after matching or aligning the first and second through holes 211 and 111.

Although the second through holes 111 are alternately formed in every second lead plate 100 in FIG. 2, the current embodiment is not limited thereto. For example, the second through holes 111 may be formed in each of the lead plates 100, and the first through holes 211 may be correspondingly formed in the first connection unit 210, thereby guiding bonding positions between the first connection unit 210 and the lead plates 100.

The second connection unit 220 is bonded to the lower surfaces of the lead plates 100 to fix the lead plates 100. Although the second connection unit 220 has a planar tape shape in FIG. 2, like the first connection unit 210, through holes may be formed in the second connection unit 220 to correspond to the second through holes 111 of the lead plates 100, thereby guiding bonding positions.

Here, although the second connection unit 220 has a planar tape shape in FIG. 2, like the first connection unit 210, portions at one side of the second connection unit 220 may protrude to contact portions of the sensing parts 140.

Since the lead plates 100 are aligned adjacent to each other via the first and second protrusions 120 and 130 and the second and first recesses 160 and 150, and are bonded to the first and second connection units 210 and 220, a region between neighboring lead plates 100 of the electrode connector 10 (i.e., a region where the first or second protrusion 120 or 130 of any one lead plate 100 is accommodated in the second or first recess 160 or 150 of another lead plate 100) also has a sufficient rigidity. Accordingly, the electrode connector 10 may be maintained in a planar shape. If the lead plates 100 include only the main bodies 110 and are connected via the first and second connection units 210 and 220, since a space between neighboring lead plates 100 has only a rigidity obtained due to bonding of the first and second connection units 210 and 220, the electrode connector 10 may be bent in a direction of gravity and thus may not be easily maintained in a planar shape. However, according to the current embodiment, a region between neighboring lead plates 100 may have a sufficient rigidity, and workability when electrode terminals of batteries are welded to the electrode connector 10 may be improved.

Although the connection unit 200 includes the first and second connection units 210 and 220 in FIG. 2, the current embodiment is not limited thereto. For example, only the first connection unit 210 or the second connection unit 220 may be included to integrally connect the lead plates 100.

Although five lead plates 100 are illustrated in FIGS. 1 and 2, the number of lead plates 100 may vary according to the number of batteries to be electrically connected by the electrode connector 10.

Figure 4:
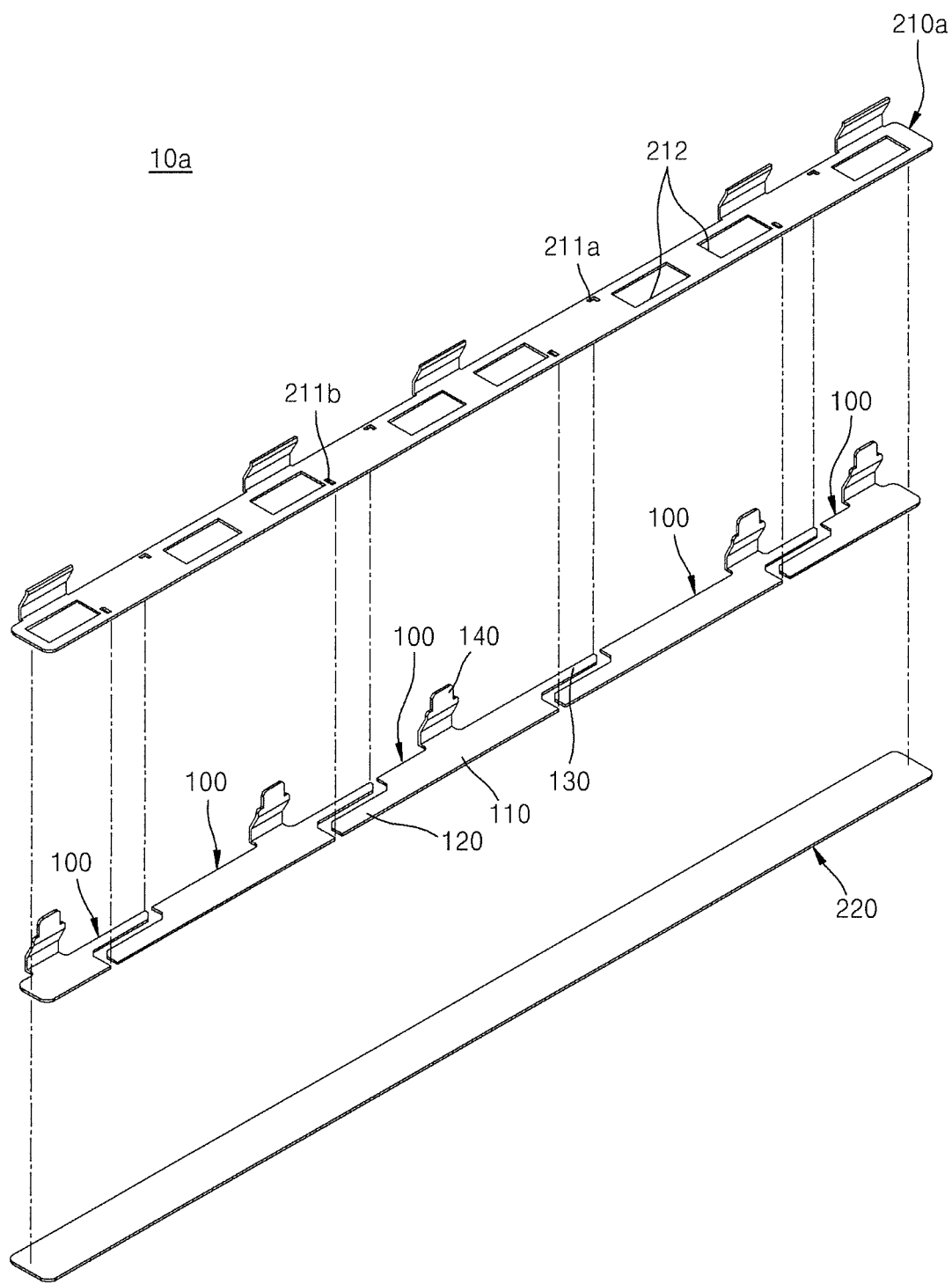
FIG. 4 is an exploded perspective view of an electrode connector according to another embodiment of the present invention.

FIG. 4 is an exploded perspective view of an electrode connector 10a according to another embodiment of the present invention.

Referring to FIG. 4, the electrode connector 10a according to an embodiment also includes a plurality of lead plates 100 and first and second connection units 210a and 220 for integrally connecting the lead plates 100. The lead plate 100 includes a main body 110 for contacting electrode terminals, first and second protrusions 120 and 130 as well as second and first recesses 160 and 150 formed respectively at two sides of the main body 110, and a sensing part 140. Here, as described above in reference to FIGS. 1 and 2, the first connection unit 210a includes partially open regions 212 for allowing the main bodies 110 to directly contact electrode terminals.

However, according to the current embodiment, a difference exists in that through holes are not formed in the lead plates 100, and through holes 211a and 211b are formed only in the first connection unit 210a to function as marks. Hereinafter, the difference will be described in more detail.

The through holes 211a and 211b are formed in the first connection unit 210a to correspond to the shape of the lead plates 100. For example, the through holes 211a formed in the first connection unit 210a may be formed to correspond to ends of the second protrusions 130, and the through holes 211b may be formed to correspond to ends of the first protrusions 120. The through holes 211a and 211b formed in the first connection unit 210a may determine the positions of the lead plates 100.

Figure 5:
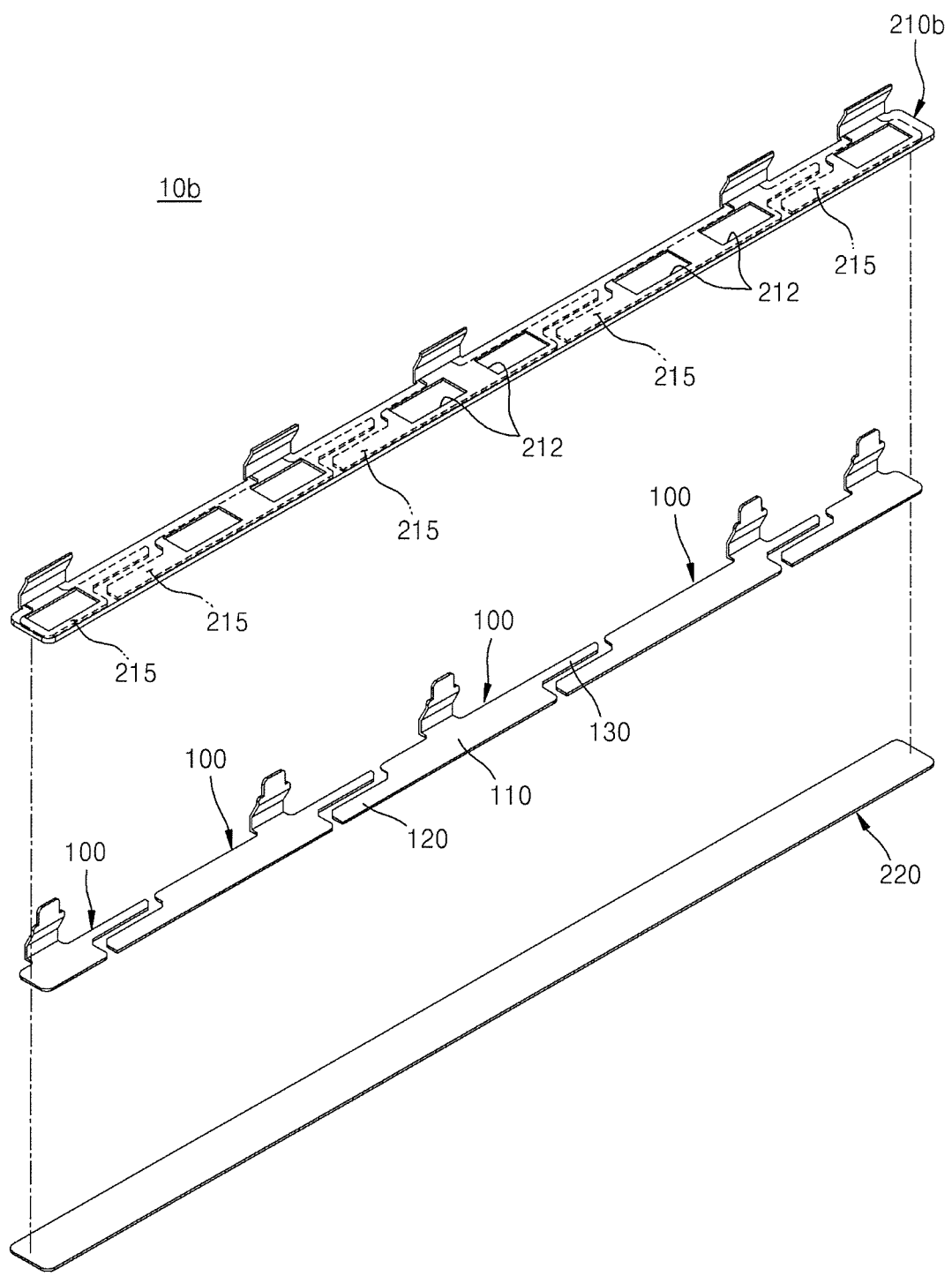
FIG. 5 is an exploded perspective view of an electrode connector according to another embodiment of the present invention.

FIG. 5 is an exploded perspective view of an electrode connector 10b according to another embodiment of the present invention.

Referring to FIG. 5, the electrode connector 10b according to the current embodiment also includes a plurality of lead plates 100 and first and second connection units 210b and 220 for integrally connecting the lead plates 100. The lead plate 100 includes a main body 110 contacting electrode terminals, first and second protrusions 120 and 130 as well as second and first recesses 160 and 150 formed respectively at two sides of the main body 110, and a sensing part 140. Here, as described above in reference to FIGS. 1 and 2, the first connection unit 210b includes partially open regions 212 for allowing the main bodies 110 to directly contact electrode terminals.

However, according to the current embodiment, a difference exists in that through holes are not formed in the lead plates 100, and grooves 215 for accommodating the lead plates 100 are formed in the first connection unit 210b to function as marks. Hereinafter, the difference will be described in more detail.

The first connection unit 210b has a tape shape extending in one direction, and has a thickness (e.g., a predetermined thickness). The grooves 215 are formed in one surface of the first connection unit 210b for receiving or contacting upper surfaces of the lead plates 100. The grooves 215 have substantially the same shape as that of the lead plates 100, and thus may accommodate the lead plates 100 while functioning as marks for guiding the positions of the lead plates 100.

The lead plates 100 that are sequentially aligned in one direction are accommodated in the grooves 215 of the first connection unit 210b and are bonded to the first connection unit 210. After that, the second connection unit 220 may contact lower surfaces of the lead plates 100.

Figure 6:
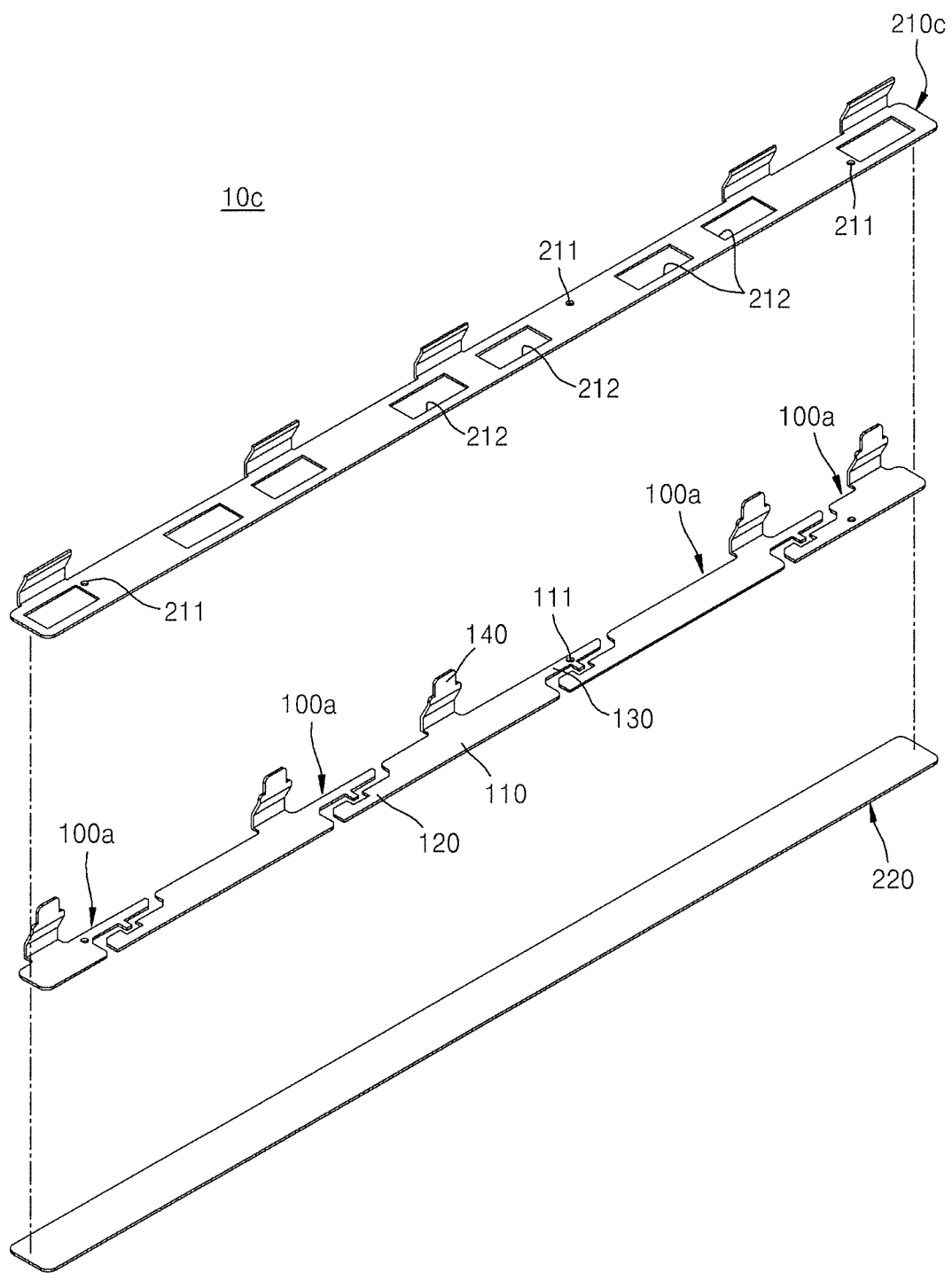
FIG. 6 is an exploded perspective view of an electrode connector according to another embodiment of the present invention.

FIG. 6 is an exploded perspective view of an electrode connector 10c according to another embodiment of the present invention.

Referring to FIG. 6, the electrode connector 10c according to the current embodiment also includes a plurality of lead plates 100a and first and second connection units 210c and 220 for integrally connecting the lead plates 100. The lead plate 100a includes a main body 110 contacting electrode terminals, first and second protrusions 120 and 130 as well as second and first recesses 160 and 150 formed respectively at two sides of the main body 110, and a sensing part 140. Also, as described above in reference to FIGS. 1 and 2, the first connection unit 210c and the lead plates 100a respectively include the first and second through holes 111 and 211, and the first connection unit 210c includes partially open regions 212 for allowing the main bodies 110 to directly contact electrode terminals.

However, although the first and second protrusions 120 and 130 of the lead plates 100a have the same shape as those of the lead plates 100 in FIGS. 1 and 2, according to the current embodiment, a difference exists in that the first and second protrusions 120 and 130 of the lead plates 100a have different shapes, and another difference exists in the positions of the first and second through holes 111 and 211.

The first protrusion 120 may protrude from one side of the main body 110 and have a concave portion, and the second protrusion 130 may protrude from another side of the main body 110 to have a convex portion. As described above in reference to FIGS. 1 and 2, the first protrusion 120 of one lead plate 100a may be accommodated in the first recess 150 of a neighboring lead plate 100a, and the second protrusion 130 of the lead plate 100a may be accommodated in the second recess 160 of another neighboring lead plate 100a.

Here, the second through holes 111 may be formed in one or more of the first and second protrusions 120 and 130 of the lead plates 100a, and the connection unit 200 may have the first through holes 211 corresponding to the second through holes 111.

Figure 7:
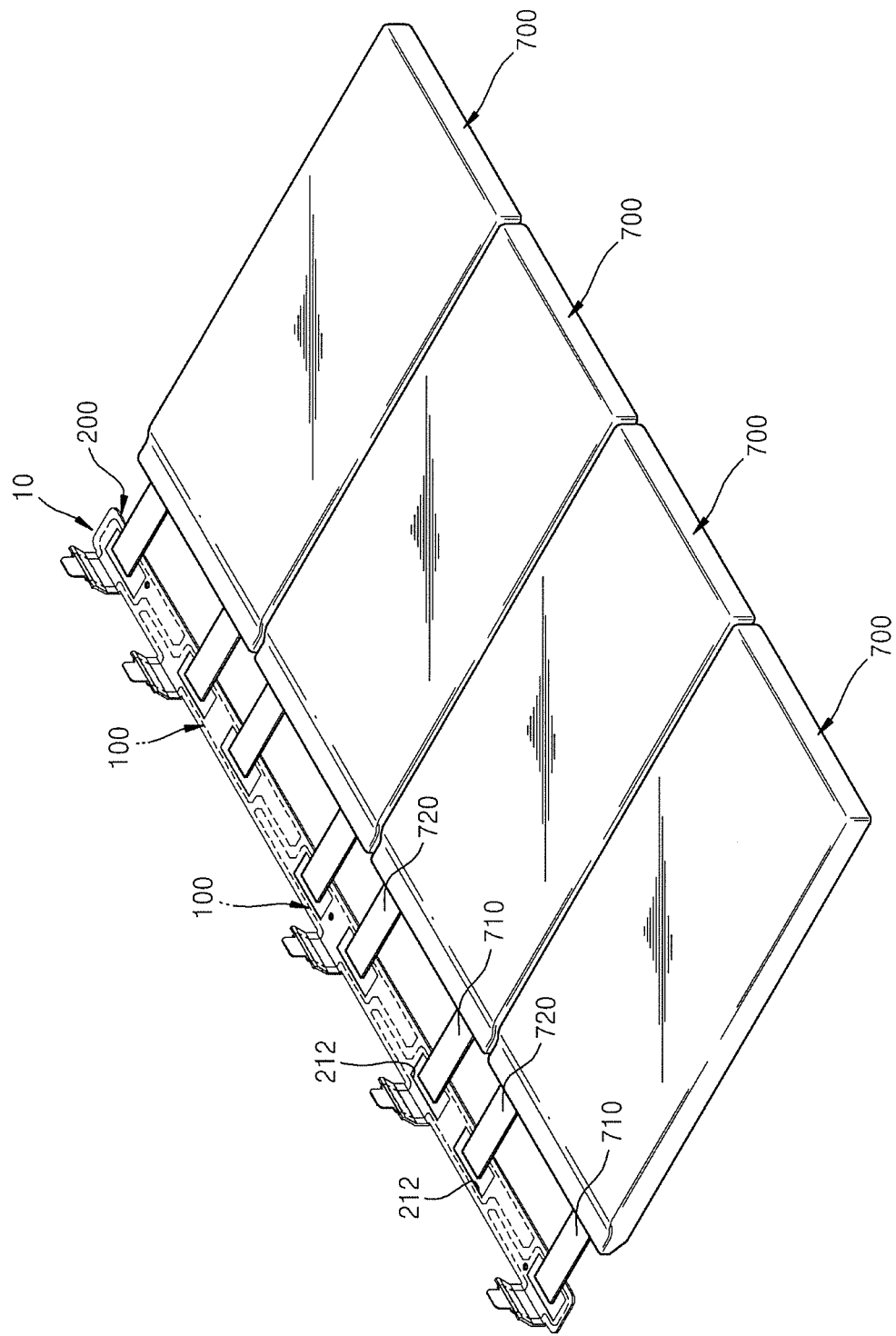
FIG. 7 is a perspective view of a battery module according to an embodiment of the present invention.

FIG. 7 is a perspective view of a battery module according to an embodiment of the present invention.

Referring to FIG. 7, the battery module includes a plurality of batteries 700 and an electrode connector 10 for electrically connecting the batteries 700.

The batteries 700 may be secondary batteries that are rechargeable. For example, the batteries 700 may be lithium secondary batteries or polymer batteries. The batteries 700 may supply power to one of various electronic devices such as laptop computers and power tools.

The electrode connector 10 electrically connects the batteries 700. As described above in reference to FIGS. 1 through 6, the electrode connector 10 includes a plurality of lead plates 100 and a connection unit 200 for integrally connecting the lead plates 100, and a detailed structure of the electrode connector 10 will not be repeatedly described here.

The electrode connector 10 extends in one direction, and contacts electrode terminals 710 and 720 of the batteries 700. Portions of the lead plates 100 of the electrode connector 10 are exposed through open regions 212 of the connection unit 200. The electrode terminals 710 and 720 of each battery 700 directly contact the lead plate 100 through the open regions 212. The lead plates 100 and the electrode terminals 710 and 720 may be welded or soldered to be maintained in a contacting state.

In this case, one lead plate 100 contacts the electrode terminals 710 and 720 of different batteries 700. For example, each lead plate 100 may contact the electrode terminal 720 (e.g., a negative electrode terminal) of one battery 700 and the electrode terminal 710 (e.g., a positive electrode terminal) of another battery 700. Alternatively, each lead plate 100 may contact the electrode terminal 710 (e.g., a positive electrode terminal) of one battery 700 and the electrode terminal 720 (e.g., a negative electrode terminal) of another battery 700.

Since the electrode connector 10 has a rigidity (e.g., a predetermined rigidity) due to the first and second protrusions 120 and 130 and the second and first recesses 160 and 150 for accommodating the first and second protrusions 120 and 130 as illustrated in FIGS. 1 and 2, the electrode connector 10 and the electrode terminals 710 and 720 may be easily welded or soldered. For example, when the electrode connector 10 and the electrode terminals 710 and 720 are welded, the electrode connector 10 is not substantially bent or curved in a direction of gravity. Accordingly, positions of the electrode connector 10 and the electrode terminals 710 and 720 may be easily set or maintained.

Here, since one electrode connector 10 electrically connects the batteries 700, unnecessary wirings may be reduced. Also, since the electrode connector 10 is insulated by the connection unit 200 except the portions contacting the electrode terminals 710 and 720, shorts due to other wirings may be prevented.

As described above, according to one or more of the above embodiments of the present invention, since lead plates are aligned in such a way that a protrusion of one lead plate is accommodated in a recess of another lead plate, an electrode connector may have a sufficient rigidity. Accordingly, a plurality of batteries may be easily electrically connected.

Since one electrode connector electrically connects a plurality of batteries, unnecessary wirings may be reduced.

It should be understood that the exemplary embodiments described therein should be considered in a descriptive sense only and not for purposes of limitation. Descriptions of features or aspects within each embodiment should typically be considered as available for other similar features or aspects in other embodiments. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
  a plurality of batteries;
  a plurality of lead plates sequentially aligned in one direction and for electrically connecting the batteries; and
  a connection unit comprising an electrically insulating tape, wherein said connection unit is bonded to the lead plates via said electrically insulating tape such that the lead plates are electrically insulated from the connection unit,
  wherein each of the lead plates comprises at least one protrusion and at least one recess,
  wherein the protrusion of a first one of the lead plates is accommodated in the recess of a second one of the lead plates
  wherein the first one of the lead plates and the second one of the lead plates are spaced apart from each other
  wherein the connection unit includes a first connection unit bonded to upper surfaces of the lead plates, said first connecting unit having open regions through which the battery electrode terminals directly contact the lead plates; and
  wherein the connection unit includes a second connection unit bonded to the first connection unit and lower surfaces of the lead plates.

2. The battery module of claim 1, wherein one of the lead plates contacts an electrode terminal of a first battery and an electrode terminal of a second battery from among the batteries.

3. The battery module of claim 2, wherein the lead plates and the electrode terminals are welded or soldered together.

4. The battery module of claim 1, wherein one of the lead plates comprises:
  a main body contacting electrode terminals of corresponding ones of the batteries; and
  wherein the at least one protrusion comprises:
  a first protrusion protruding from a first side of the main body; and
  a second protrusion protruding from a second side of the main body.

5. The battery module of claim 4, wherein the at least one recess comprises:
  a first recess formed at the second side of the main body and having a shape corresponding to the first protrusion; and a second recess formed at the first side of the main body and having a shape corresponding to the second protrusion.

6. The battery module of claim 1, wherein the one of the lead plates further comprises a sensing part for monitoring a state of a corresponding one of the batteries.

7. The battery module of claim 1, wherein the connection unit is on upper surfaces or lower surfaces of the lead plates.

8. The battery module of claim 1, wherein the connection unit has marks or grooves for determining positions of the lead plates.

9. The battery module of claim 1, wherein the connection unit comprises:
   a first connection unit bonded to upper surfaces of the lead plates, and comprising open regions for allowing electrode terminals of the batteries to directly contact the lead plates; and
   a second connection unit bonded to the first connection unit and lower surfaces of the lead plates.

10. The battery module of claim 4, wherein the first and second protrusions are symmetrical with respect to a center of the main body.

* * * * *